(12) United States Patent
Klipper et al.

(10) Patent No.: US 9,950,320 B2
(45) Date of Patent: Apr. 24, 2018

(54) SULFONATED AMINOMETHYLATED CHELATE RESINS

(71) Applicant: LANXESS Deutschland GmbH, Cologne (DE)

(72) Inventors: Reinhold Klipper, Cologne (DE); Stefan Neufeind, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/502,641

(22) PCT Filed: Aug. 17, 2015

(86) PCT No.: PCT/EP2015/068827
§ 371 (c)(1),
(2) Date: Feb. 8, 2017

(87) PCT Pub. No.: WO2016/026804
PCT Pub. Date: Feb. 25, 2016

(65) Prior Publication Data
US 2017/0216833 A1 Aug. 3, 2017

(30) Foreign Application Priority Data
Aug. 20, 2014 (EP) ..................... 14181606

(51) Int. Cl.
| | | |
|---|---|---|
| B01J 45/00 | (2006.01) |
| C02F 1/28 | (2006.01) |
| B01D 15/00 | (2006.01) |
| C01F 17/00 | (2006.01) |
| C01G 15/00 | (2006.01) |
| C01G 13/00 | (2006.01) |
| C01G 49/00 | (2006.01) |
| C01G 51/00 | (2006.01) |
| C01G 53/00 | (2006.01) |
| C01G 3/00 | (2006.01) |
| C01G 9/00 | (2006.01) |
| C01G 21/00 | (2006.01) |
| C01G 11/00 | (2006.01) |
| C01G 45/00 | (2006.01) |
| C01G 43/00 | (2006.01) |
| C01G 31/00 | (2006.01) |
| C01G 55/00 | (2006.01) |
| C01G 5/00 | (2006.01) |
| C01G 7/00 | (2006.01) |
| C01B 33/023 | (2006.01) |
| C08F 212/08 | (2006.01) |
| C08F 8/36 | (2006.01) |
| C08F 8/30 | (2006.01) |

C08F 8/40 (2006.01)
C02F 101/20 (2006.01)
C02F 101/00 (2006.01)

(52) U.S. Cl.
CPC ............. *B01J 45/00* (2013.01); *B01D 15/00* (2013.01); *C01B 33/023* (2013.01); *C01F 17/0006* (2013.01); *C01G 3/003* (2013.01); *C01G 5/003* (2013.01); *C01G 7/003* (2013.01); *C01G 9/003* (2013.01); *C01G 11/003* (2013.01); *C01G 13/003* (2013.01); *C01G 15/003* (2013.01); *C01G 21/003* (2013.01); *C01G 31/003* (2013.01); *C01G 43/003* (2013.01); *C01G 45/003* (2013.01); *C01G 49/0009* (2013.01); *C01G 51/003* (2013.01); *C01G 53/003* (2013.01); *C01G 55/001* (2013.01); *C02F 1/285* (2013.01); *C08F 8/30* (2013.01); *C08F 8/36* (2013.01); *C08F 8/40* (2013.01); *C08F 212/08* (2013.01); *C01P 2006/80* (2013.01); *C02F 2101/006* (2013.01); *C02F 2101/203* (2013.01); *C02F 2101/206* (2013.01)

(58) Field of Classification Search
None
See application file for complete search history.

(56) References Cited

U.S. PATENT DOCUMENTS

| 3,847,842 A * | 11/1974 | Suzuki ..................... B01J 45/00 521/32 |
| 4,309,327 A * | 1/1982 | Ishikura .................. C08F 12/14 427/409 |
| 4,382,124 A | 5/1983 | Meitzner et al. |
| 4,419,245 A | 12/1983 | Barrett et al. |
| 4,427,794 A | 1/1984 | Lange et al. |
| 4,444,961 A | 4/1984 | Timm |
| 5,231,115 A | 7/1993 | Harris |
| 7,077,964 B2 | 7/2006 | Klipper et al. |
| 8,568,683 B2 | 10/2013 | Amendola |
| 2001/0038937 A1 * | 11/2001 | Suzuki ....................... C08J 5/20 429/492 |
| 2013/0139649 A1 * | 6/2013 | Schelhaas ................ B01J 45/00 75/714 |

OTHER PUBLICATIONS

European Search Report from European Application No. 14181606, dated Jan. 21, 2015, two pages.

* cited by examiner

*Primary Examiner* — Robert C Boyle

(57) ABSTRACT

The invention relates to sulfonated aminomethylated chelate resins, to a method for producing same, to the use thereof for obtaining and purifying metals, in particular rare earth metals, from aqueous solutions and organic liquids, and for producing highly pure silicon.

18 Claims, No Drawings

SULFONATED AMINOMETHYLATED CHELATE RESINS

The present invention relates to sulfonated, aminomethylated chelating resins, to a process for the preparation thereof and to the use thereof for recovery and purification of metals, especially rare earths from aqueous solutions and organic liquids and for preparation of high-purity silicon.

Novel chelating resins are the target of intensive research since they have a significant use potential for example in the field of water purification or recovery of metals.

EP-A 1078690 discloses a process for preparation of an aminomethytated chelating resin suitable for adsorption of heavy metals and noble metals. This process includes inter alia a step for introducing an aminomethyl group by reaction of phthalimide and formalin in the presence of a catalytic amount of an $SO_3$ donor and subsequent acid- or base-catalyzed hydrolysis. Apart from the fact that the employed $SO_3$ has merely a catalytic effect, the use of larger amounts of $SO_3$ was hitherto avoided in order not to jeopardize the structure and stability of the phthalimidomethylated resin being formed.

It has now been found that, surprisingly, the use of significantly larger amounts of $SO_3$ not only allows catalytic introduction of the phthalimidomethyl group but also simultaneously makes it possible to sulfonate the resin without essentially damaging the structure of the resin.

The present invention accordingly provides a chelating resin comprising functional groups of structural element (I)

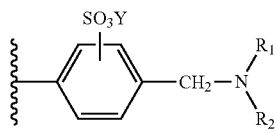

(I)

in which ⌇⌇⌇ F represents the polymer skeleton and $R_1$ and $R_2$ independently of one another represent $-CH_2COOX$, $-CH_2PO(OX^1)_2$, $-CH_2PO(OH)OX^2$, $-(CS)NH_2$, $-CH_2$-pyridyl or hydrogen, wherein $R_1$ and $R_2$ cannot both simultaneously be hydrogen and X, $X^1$, $X^2$ and Y independently of one another represent hydrogen, sodium or potassium.

It is preferable when $R_1$ and $R_2$ independently of one another are $-CH_2PO(OX^1)_2$, $-CH_2PO(OH)OX^2$, $CH_2COOX$ or hydrogen, wherein $R_1$ and $R_2$ cannot both simultaneously be hydrogen. It is particularly preferable when $R_1$ is hydrogen, $-CH_2PO(OX^1)_2$ or $-CH_2PO(OH)OX^2$ and $R_2$ is $-CH_2PO(OX^2)_2$ or $-CH_2PO(OH)OX^2$. It is very particularly preferable when $R_1$ is hydrogen and $R_2$ is $-CH_2PO(OX^2)_2$ or $-CH_2PO(OH)OX^2$. X, $X^1$, $X^2$ and Y independently of one another represent hydrogen, sodium or potassium. It is preferable when X, $X^1$ and $X^2$ independently of one another represent hydrogen. $X^1$ and $X^2$ are preferably identical. Y preferably represents hydrogen.

It is preferable when the phenyl ring in structural formula (I) is substituted by a sulfonic acid radical in the ortho position to the methylene group.

The invention further comprises a process for preparation of the chelating resins comprising functional groups of structural element (I)

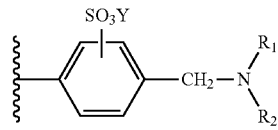

(I)

in which ⌇⌇⌇ represents the polymer skeleton and $R_1$ and $R_2$ independently of one another represent $-CH_2COOX$, $-CH_2PO(OX^1)_2$, $-CH_2PO(OH)OX^2$, $-(CS)NH_2$, $-CH_2$-pyridyl or hydrogen, wherein $R_1$ and $R_2$ cannot both simultaneously be hydrogen and X, $X^1$, $X^2$ and Y independently of one another represent hydrogen, sodium or potassium, characterized in that it comprises
a) converting monomer droplets composed of at least one monovinylaromatic compound and at least one polyvinylaromatic compound and at least one initiator or an initiator combination into a bead polymer,
b) phthalimldomethylating and sulfonating the bead polymer with phthalimide in the presence of oleum, wherein the amount of free $SO_3$ is at least 0.69 mol based on 1 mol of phthalimide,
c) converting the phthalimidomethylated, sulfonated bead polymer into aminomethylated, sulfonated bead polymer and
d) reacting the aminomethylated, sulfonated bead polymer to afford chelating resins comprising functional groups of structural element (I).

The chelating resins comprising functional groups of structural element (I) are preferably characterizable by the process for preparation itself.

The present invention accordingly also provides chelating resins comprising functional groups of structural element (I)

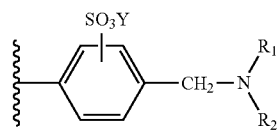

(I)

in which ⌇⌇⌇ represents the polymer skeleton and $R_1$ and $R_2$ independently of one another represent $-CH_2COOX$, $-CH_2PO(OX^1)_2$, $-CH_2PO(OH)OX^2$, $-(CS)NH_2$, $-CH_2$-pyridyl or hydrogen, wherein $R_1$ and $R_2$ cannot both simultaneously be hydrogen and X, $X^1$, $X^2$ and Y independently of one another represent hydrogen, sodium or potassium, prepared by
a) converting monomer droplets composed of at least one monovinylaromatic compound and at least one polyvinylaromatic compound and at least one initiator or an initiator combination into a bead polymer,
b) phthalimidomethylating and sulfonating the bead polymer with phthalimide in the presence of oleum, wherein the amount of free $SO_3$ is at least 0.69 mol based on 1 mol of phthalimide,
c) converting the phthalimidomethylated, sulfonated bead polymer into aminomethylated, sulfonated bead polymer and
d) reacting the aminomethylated, sulfonated bead polymer to afford chelating resins comprising functional groups of structural element (I).

Chelating resins for the purposes of the invention are polymers based on at least one monovinylaromatic compound and at least one polyvinylaromatic compound. It is preferable when chelating resins for the purposes of the invention are polymers composed of styrene, divinylbenzene and ethylstyrene.

The purview of the invention comprehends all the hereinabove and hereinbelow, cited as within general or preferred ranges, radical definitions, parameters and explanations in any desired combination with one another including, that is, between the particular general and preferred ranges.

At least one monovinylaromatic compound and at least one polyvinylaromatic compound are employed in process step a). However, it is also possible to use mixtures of two or more monovinylaromatic compounds or mixtures of two or more polyvinylaromatic compounds.

For the purposes of the present invention, the monovinylaromatic compounds used in process step a) are preferably styrene, vinyltoluene, ethylstyrene, α-methylstyrene, chlorostyrene, chloromethylstyrene, alkyl acrylates or alkyl methacrylates.

It is especially preferable to use styrene or mixtures of styrene with the abovementioned monomers, preferably with ethylstyrene.

For the purposes of the present invention, preferred polyvinylaromatic compounds for process step a) are divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate and allyl methacrylate, especially preferably divinylbenzene.

The polyvinylaromatic compounds are preferably used in amounts of 1%-20% by weight, more preferably 2%-12% by weight, especially preferably 4%-10% by weight, based on the monomer or mixture thereof with other monomers. The type of polyvinylaromatic compound (crosslinker) is selected with a view to the later use of the bead polymer. In the case of use of divinylbenzene, commercial grades of divinylbenzene also comprising ethylvinylbenzene as well as the isomers of divinylbenzene are sufficient.

The term "bead polymer" for the purposes of the invention is a crosslinked polymer in bead form.

The terms "microporous" or "in gel form" and "macroporous" have already been described in detail in the specialist literature.

Macroporous bead polymers are formed by addition of inert materials, preferably at least one porogen, to the monomer mixture in the course of polymerization, in order to produce a macroporous structure in the bead polymer. Suitable porogens include organic solvents that are poor solvents and/or swellants for the bead polymer formed. Especially preferred porogens are hexane, octane, isooctane, isododecane, methyl ethyl ketone, butanol or octanol, and isomers thereof. Particularly suitable substances are organic substances which dissolve in the monomer but dissolve or swell the bead polymer sparingly (precipitant for polymers), for example aliphatic hydrocarbons (Farbenfabriken Bayer DBP 1045102, 1957; DBP 1113570, 1957).

U.S. Pat. No. 4,382,124 uses as a porogen alcohols having 4 to 10 carbon atoms, which are likewise to be used with preference in the context of the present invention, for preparation of monodisperse, macroporous bead polymers based on styrene/divinylbenzene. In addition, an overview of the preparation methods for macroporous bead polymers is given.

It is preferable when at least one porogen is added in process step a). The bead polymers and the chelating resins comprising functional groups of structural element (I) preferably have a macroporous structure.

The bead polymers prepared according to process step a) can be prepared in heterodisperse or monodisperse form.

The preparation of heterodisperse bead polymers is accomplished by general processes known to those skilled in the art, for example with the aid of suspension polymerization.

Preference is given to preparing monodisperse bead polymers in process step a).

In the present application, monodisperse materials are those in which at least 90% by volume or % by mass of the particles have a diameter within the range of ±10% of the most common diameter.

For example, in the case of a material having a most common diameter of 0.5 mm, at least 90% by volume or % by mass is within a size range between 0.45 mm and 0.55 mm; in the case of a material having a most common diameter of 0.7 mm, at least 90% by volume or % by mass is within a size range between 0.77 mm and 0.63 mm.

In a preferred embodiment of the present invention, in process step a), microencapsulated monomer droplets are used in the preparation of monodisperse bead polymers.

Useful materials for microencapsulation of the monomer droplets are those known for use as complex coacervates, especially polyesters, natural and synthetic polyamides, polyurethanes or polyureas.

Gelatin is a natural polyamide used with preference. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutardialdehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The optionally microencapsulated monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably used in amounts of 0.05% to 2.5% by weight, more preferably 0.1% to 1.5% by weight, based on the monomer mixture.

The optionally monodisperse microencapsulated monomer droplets may optionally also contain up to 30% by weight (based on the monomer) of crosslinked or uncrosslinked polymer. Preferred polymers derive from the aforementioned monomers, more preferably from styrene.

In the preparation of monodisperse bead polymers, in process step a), the aqueous phase, in a further preferred embodiment, may comprise a dissolved polymerization inhibitor. In this case, useful inhibitors are either inorganic or organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulfur compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further preferred organic inhibitors are nitrogen compounds. Especially preferred are hydroxylamine derivatives, for example N,N-diethylhydroxylamine, N-isopropylhydroxylamine and sulfonated or carboxylated N-alkylhydroxylamine or N,N-dialkylhydroxylamine derivatives, hydrazine derivatives, for example N,N-hydrazinodiacetic acid, nitroso compounds, for example N-nitrosophenylhydroxylamine, N-nitrosophenylhydroxylamine ammonium salt or N-nitrosophenylhydroxylamine aluminum salt. The concentration of the inhibitor is 5-1000 ppm (based on the aqueous phase), preferably 10-500 ppm, more preferably 10-250 ppm.

The polymerization of the optionally microencapsulated monodisperse monomer droplets to give the monodisperse bead polymer is effected, as already mentioned above, optionally or preferably in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The amount of the protective colloids used is generally 0.05% to 1% by weight, based on the aqueous phase, preferably 0.05% to 0.5% by weight.

The polymerization to give the monodisperse bead polymer can, in an alternative preferred embodiment, be conducted in the presence of a buffer system. Preference is given to buffer systems which set the pH of the aqueous phase on commencement of the polymerization to a value between 14 and 6, preferably between 12 and 8. Under these conditions, protective colloids having carboxylic acid groups are wholly or partly present as salts. This causes a favorable effect on the action of the protective colloids. Particularly highly suitable buffer systems contain phosphate or borate salts. The terms "phosphate" and "borate" in the context of the invention also encompass the condensation products of the ortho forms of corresponding acids and salts. The concentration of the phosphate or borate in the aqueous phase is 0.5-500 mmol/l, preferably 2.5-100 mmol/l.

The stirrer speed in the polymerization to give the monodisperse bead polymer is less critical and, in contrast to conventional bead polymerization, has no effect on the particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is from 1:0.75 to 1:20, preferably 1:1 to 1:6.

The polymerization temperature to give the monodisperse bead polymer is guided by the decomposition temperature of the initiator used. It is generally between 50 to 180° C., preferably between 55 and 130° C. Polymerization takes 0.5 to about 20 hours. It has been found to be useful to employ a temperature program in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After the polymerization, the monodisperse bead polymer is isolated by conventional methods, for example by filtering or decanting, and optionally washed.

The preparation of the monodisperse bead polymers with the aid of the jetting principle or the seed-feed principle is known from the prior art and described, for example, in U.S. Pat. No. 4,444,961, EP-A 0 046 535, U.S. Pat. No. 4,419,245 or WO 93/12167, the contents of which are fully incorporated into the present application in respect of the preparation of monodisperse bead polymers of the present application.

Preference is given to preparing the monodisperse bead polymers with the aid of the jetting principle or the seed-feed principle.

In process step b), initially, the amidomethylation reagent is prepared. To this end, phthalimide is dissolved in a solvent and admixed with formalin. A bis(phthalimido) ether is then formed from this mixture, with elimination of water. The bis(phthalimido) ether may optionally be converted into the phthalimido ester. Solvents used in process step b) are inert solvents suitable for swelling the polymer, preferably chlorinated hydrocarbons, more preferably dichloroethane or methylene chloride.

In process step b), the bead polymer is condensed with phthalimide. The catalyst and sulfonating agent employed here is oleum. With the aid of the oleum an $SO_3$ adduct of the phthalimide is prepared in an inert solvent and the sulfonation performed.

Generally, the oleum is added after formation of the bis(phthalimido) ether and the bead polymer is introduced thereafter. However, the addition may also be effected in a different sequence. It is preferable when the oleum is added after formation of the bis(phthalimido) ether and the bead polymer is introduced thereafter.

Oleum may be employed in a very wide variety of free $SO_3$ concentrations. Concentrations of 24%, 34% and 65% by weight of free $SO_3$ in concentrated sulfuric acid are commercially available. It is particularly preferable to employ oleum having a proportion of free $SO_3$ of 65% by weight.

If oleum having an amount of free $SO_3$ of 65% by weight is employed, the amount of oleum employed in process step b) is generally 0.59 grams to 1.5 grams of oleum to 1 gram of phthalimide but may also be smaller or larger. The amount is preferably 0.59 grams to 1.25 grams of oleum per gram of phthalimide if oleum having an amount of free $SO_3$ of 65% by weight is employed.

The amount of phthalimide which is used in process step b) is generally 0.3 to 1.6 mol per mole of phthalimide but may also be smaller or larger. Preference is given to using 0.5 to 1.1 mol of phthalimide per mole of bead polymer.

The catalytic introduction of the amidomethyl group and the sulfonation is effected in process step b) at temperatures of 40° C. to 80° C., preferably at temperatures of 50° C. to 70° C. The amount of free $SO_3$ based on 1 mol of phthalimide is between 0.69 mol to 1.5 mol. The amount of free $SO_3$ in process step b) based on 1 mol of phthalimide is preferably 0.69 mol to 1.2 mol.

The degree of substitution in the present application indicates the molar ratio of the aromatic groups of the bead polymer to the aminomethyl groups.

The degree of substitution is generally 0.3 to 1.5. However, the degree of substitution may also be smaller or larger. The degree of substitution is preferably 0.6 to 1.1.

The degree of sulfonation in the present application indicates the molar ratio of the aromatic groups of the bead polymer to the sulfonic acid groups.

The ratio of the degree of sulfonation to the degree of substitution is generally between 0.1 to 1.0 but may also be larger or smaller. The ratio of the degree of sulfonation to the degree of substitution is preferably between 0.3 and 0.5.

The elimination of the phthalic acid radical and thus the liberation of the aminomethyl group is effected in process step c) by treatment of the phthalimidomethylated, sulfonated bead polymer with aqueous or alcoholic solutions of an alkali metal hydroxide, such as sodium hydroxide or potassium hydroxide, at temperatures of from 100 to 250° C., preferably from 120 to 190° C. The concentration of the sodium hydroxide solution is in the range from 10% to 50% by weight, preferably from 20% to 40% by weight.

The resultant aminomethylated, sulfonated bead polymer is finally washed with demineralized water until free from alkali metal.

The conversion of the aminomethyl-containing, sulfonated bead polymers obtained in process step c) into the chelating resins comprising functional groups of structural element (I) is effected by commonly used processes known to those skilled in the art.

It is preferable when the preparation of the inventive chelating resins comprising functional groups of structural element (I), wherein $R_1$ and $R_2$ independently of one another are —$CH_2COOX$ or H but $R_1$ and $R_2$ cannot simultaneously represent hydrogen and X represents hydrogen, sodium or potassium, is effected by reaction of the aminomethyl-containing, sulfonated bead polymer from process step c) in aqueous suspension with chloroacetic acid or derivatives thereof. An especially preferred chloroacetic acid derivative is the sodium salt of chloroacetic acid.

The sodium salt of chloroacetic acid is preferably used as an aqueous solution.

The aqueous solution of the sodium salt of chloroacetic acid is metered into the initially charged aqueous suspension of the aminomethyl-containing, sulfonated bead polymer at the reaction temperature over 0.5 to 15 hours. The metering is preferably effected over 5 to 11 hours.

The hydrochloric acid released in the reaction of the aminomethyl-containing, sulfonated bead polymers with chloroacetic acid is partly or fully neutralized by addition of aqueous sodium hydroxide solution so that the pH of the aqueous suspension in this reaction is adjusted to within the range between pH 5 to 10.5. The reaction is preferably performed at pH 9.5.

The reaction of the aminomethyl-containing, sulfonated bead polymers with chloroacetic acid is performed at temperatures in the range between 50° C. and 100° C. The reaction of the aminomethyl-containing, sulfonated bead polymers with chloroacetic acid is preferably performed at temperatures in the range between 80° C. and 95° C.

The suspension medium used is water or aqueous salt solution. Contemplated salts include alkali metal salts, especially NaCl and sodium sulfate.

It is preferable when the preparation of the inventive chelating resins functional groups of structural element (I), wherein $R_1$ and $R_2$ independently of one another are —$CH_2PO(OX^1)_2$, —$CH_2PO(OH)OX^2$ or hydrogen but cannot both simultaneously represent hydrogen and $X^1$ and $X^2$ independently of one another represents hydrogen, sodium or potassium, is effected by reaction of the aminomethyl-containing bead polymer from process step c) in sulfuric-acid-containing suspension with formalin in combination with P—H-acidic (as per modified Mannich reaction) compounds, preferably with phosphorous acid, monoalkyl phosphorous esters or dialkyl phosphorous esters.

It is particularly preferable to use formalin in combination with P—H-acidic compounds such as phosphorous acid or dimethyl phosphite.

In the case where $R_1$ and $R_2$ independently of one another are —$CH_2PO(OX^1)_2$, —$CH_2PO(OH)OX^2$ or hydrogen but cannot both simultaneously represent hydrogen and $X^1$ and $X^2$ independently of one another represents hydrogen, sodium or potassium the conversion of the aminomethyl-containing bead polymer into chelating resins comprising functional groups of structural element (I) is preferably effected at temperatures in the range from 70° C. to 120° C., particularly preferably at temperatures in the range between 90° C. and 110° C.

It is preferable when the preparation of the inventive chelating resin comprising functional groups of structural element (I), wherein $R_1$ and $R_2$ independently of one another are —$CH_2$-pyridyl or hydrogen but cannot both simultaneously represent hydrogen, is effected in process step d) by reaction of the bead polymer from process step c) in aqueous suspension with chloromethylpyridine/the hydrochloride thereof or with 2-chloromethylquinoline or 2-chloromethylpiperidine.

Chloromethylpyridine/the hydrochloride thereof may be employed in the form of 2-chloromethylpyridine, 3-chloromethylpyridine or 4-chloromethylpyridine.

When structural element (I) represents a —$CH_2$-pyridyl radical the reaction in process step d) is preferably effected while maintaining a pH in the range from 4 to 9 and is preferably performed with addition of alkali, particularly preferably of aqueous potassium hydroxide solution or aqueous sodium hydroxide solution, especially preferably of aqueous sodium hydroxide solution. Through addition of alkali during the reaction of the aminomethyl-containing, sulfonated bead polymer from process step c) in aqueous suspension with picolyl chloride or the hydrochloride thereof, the pH during the reaction is preferably kept in the range 4-9. The pH is particularly preferably kept in the range 6-8.

When the structural element (I) represents a picolylamine radical the reaction according to process step d) is preferably effected in the temperature range of 40° C. to 100° C., particularly preferably in the temperature range of 50° C. to 80° C.

It is preferable when the preparation of the inventive chelating resins comprising functional groups of structural element (I), wherein $R_1$ and $R_2$ independently of one another are —$(CS)NH_2$ or hydrogen but cannot both simultaneously represent hydrogen, is effected by reaction of the aminomethyl-containing, sulfonated bead polymer from process step c) in hydrochloric-acid-containing suspension with thiourea or substituted thioureas or salts of thiocyanic acid. Suspension media employed are mineral acids, preferably aqueous HCl in concentrations between 10% and 40% by weight, preferably 20-35% by weight.

The reaction temperature for preparation of the inventive chelating resins comprising functional groups of structural element (I) when said element comprises at least one thiourea acidic group is between 110° C. and 170° C., preferably between 135° C. and 155° C.; the reaction duration is 4 to 20 hours, preferably 8 to 15 hours.

Surprisingly, the process according to the invention makes it possible to produce chelating resins comprising functional groups of structural element (I) which exhibit an improved adsorption for metals. The chelating resins comprising functional groups of structural element (I) are preferably suitable in particular for adsorption of heavy metals, noble metals and rare earths and the di-, tri- or tetravalent ions thereof. Heavy metals and noble metals for the purposes of the present invention are preferably mercury, gallium, iron, cobalt, nickel, copper, zinc, lead, indium, cadmium, manganese, uranium, vanadium, elements of the platinum group and gold or silver.

Rare earths for the purposes of the present invention are preferably scandium, lanthanum, cerium, praseodymium, neodymium, promethium, samarium, europium, yttrium, gadolinium, terbium, dysprosium, holmium, erbium, thulium, ytterbium, lutetium, scandium, yttrium and lanthanum and the di-, tri- or/and tetravalent ions thereof. The inventive chelating resins comprising functional groups of structural element (I) are particularly preferably suitable for adsorption of rare earths. The inventive chelating resins comprising functional groups of structural element (I) are very particularly preferably suitable for adsorption of indium, scandium, neodymium, lanthanum and praseodymium.

The inventive chelating resins comprising functional groups of structural element (I) are therefore exceptionally suitable for recovery and purification of metals, preferably of heavy metals, noble metals and rare earths and particularly preferably for adsorption of rare earths and compounds thereof from aqueous solutions and organic liquids. The present invention therefore likewise relates to the use of the inventive chelating resins comprising functional groups of the structural element (I) for adsorption of metals, preferably of heavy metals, noble metals and rare earths and compounds thereof from aqueous solutions and organic liquids.

In addition the prior art proposes preparing solar silicon by carbothermal reduction of silicon dioxide. In this regard WO2007/106860 A1 for example proposes converting high purity silica gels into solar silicon by reaction with a high-purity carbon source. The high-purity silicon dioxide required for performing such processes is preferably prepared by reaction of a silicate solution with an acidifying agent in the context of which chelating resins are also employed, preferably chelating resins comprising phosphonic acid/phosphonate groups as the functional groups. The invention therefore likewise comprehends the use of the inventive chelating resins comprising functional groups of the structural element (I) in a process for preparation and purification of silicon, preferably of silicon having a purity of greater than 99.99%. The process for preparation and purification of silicon preferably employs chelating resins comprising functional groups of structural element (I), wherein at least one radical $R_1$ or $R_2$ is independently of one another=—$CH_2PO(OX^1)_2$ or —$CH_2PO(OH)OX^2$ and $X^1$ and $X^2$ independently of one another represents hydrogen, sodium or potassium.

The process according to the invention makes it possible for the first time to prepare economic, novel, stable sulfonated chelating resins having specific adsorption properties.

Analytical Determination of Chelating Groups and of Strongly Acidic Sulfonic Acid Groups Determination of the Amount of Chelating Groups—Total Capacity (TC) of the Resin 100 ml of exchanger are filled into a filter column and eluted with 3% by weight of hydrochloric acid in 1.5 hours. The column is then washed with demineralized water until the effluent is neutral.

50 ml of regenerated ion exchanger in a column are subjected to 0.1 N sodium hydroxide solution. The effluent is in each case collected in a 250 ml measuring cylinder and the entire amount is titrated against methyl orange with 1 N hydrochloric acid.

Charging is continued until 250 ml of effluent have a consumption of 24.5-25 ml of 1 N hydrochloric acid. Once the test has been terminated the volume of exchanger in the Na form is determined.

Total capacity (TC)=$(X \cdot 25 - \Sigma V) \cdot 3$ in mol/l of exchanger

X=number of effluent fractions
$\Sigma V$=Total consumption in ml of 1 N hydrochloric acid during titration of the effluents.

Determination of Amount of Strongly Acidic Groups

TC—Na+ Form 100 ml of exchanger are measured on a tamping volumeter and washed into a filter tube under DM water. Subsequently,
1000 ml of sodium chloride solution w (NaCl)=10% are filtered through.

The exchanger is then rinsed out with DM water at the same flow rate until neutral reaction has been achieved. 100 ml of the washing water effluent, admixed with methyl orange, shall have a consumption of sodium hydroxide c (NaOH)=0.1 mol/L of not more than 0.1 ml.

Subsequently,
50 ml of exchanger are measured on a tamping volumeter and washed into a filter tube under DM water. Then,
300 ml of hydrochloric acid, w (HCL)=15%, are filtered through.

The exchanger is then rinsed out with DM water until neutral reaction has been achieved. 100 ml of washing water effluent, admixed with methyl orange, shall have a consumption of sodium hydroxide c (NaOH)=0.1 mol/L of not more than 0.1 ml.

Then,
950 ml of sodium chloride solution, w (NaCl)=2.5%, are filtered through. The effluent is collected in a 1000 ml measuring flask and made up to the mark with DM water.
10 ml of the thoroughly commixed solution are diluted with about 90 ml of DM water in a 300 ml Erlenmeyer flask and titrated against methyl orange with aqueous sodium hydroxide solution c (NaOH)=0.1 mol/l from red/orange to yellow. The exchanger is washed with one liter of DM water and the volume is then determined.

TC—H Form

For exchangers that are in the H form, the TC is determined with and without regeneration.
50 ml of the supplied form are installed and washed with 100 ml of mixed-bed water.

Subsequently, 950 ml of sodium chloride solution, w (NaCl)=2.5%, are run through.

The exchanger is then washed with one liter of DM water and the exchanger is converted into the H form as described at the start of the procedure with 300 ml of hydrochloric acid, w (HCl)=15%. The acid is rinsed out and a further 950 ml of sodium chloride solution, w (NaCl)=2.5%, are run through.

Calculations $$\text{Na Form:} \frac{\text{consumed ml of aqueous sodium hydroxide solution } c \text{ (NaOH)} = 0.1 \text{ Mol/l} \cdot 10}{\text{ml of exchanger volume in the Na Form}} = \text{mol/l exch.}$$

$$\text{H Form:} \frac{\text{consumed ml of aqueous sodium hydroxide solution } c \text{ (NaOH)} = 0.1 \text{ Mol/l} \cdot 10}{50} = \text{mol/l exch.}$$

EXAMPLE 1

Preparation of the Monodisperse Macroporous Bead Polymer Based on Styrene, Divinylbenzene and Ethylstyrene A 10 l glass reactor is initially charged with 3000 g of demineralized water and a solution of 10 g of gelatin, 16 g of disodium hydrogenphosphate dodecahydrate and 0.73 g of resorcinol in 320 g of deionized water are added and commixed. The mixture is equilibrated to 25° C. Subsequently, while stirring, a mixture of 3200 g of microencapsulated monomer droplets having a narrow particle size distribution, composed of 5% by weight of divinylbenzene and 1% by weight of ethylstyrene (used in the form of a commercial isomer mixture of divinylbenzene and ethylstyrene with 80% divinylbenzene), 0.4% by weight of dibenzoyl peroxide, 56.3% by weight of styrene and 37.5% by weight of isododecane (technical isomer mixture having a high proportion of pentamethylheptane) is added, the microcapsule consisting of a formaldehyde-hardened complex coacervate composed of gelatin and a copolymer of acrylamide and acrylic acid, and 3200 g of aqueous phase having a pH of 12 are added.

The mixture is stirred and polymerized to completion by increasing the temperature in accordance with a temperature program beginning at 25° C. and ending at 95° C. The mixture is cooled, washed over a 32 μm sieve and then dried at 80° C. under reduced pressure.

This affords 1893 g of a monodisperse bead polymer with a smooth surface.

The monodisperse bead polymer has a chalky white appearance and a bulk density of about 390 g/l.

Preparation of a Phthalimidomethylated Resin Further Comprising $SO_3H$ Groups—Molar Ratio of Free $SO_3$ to Phthalimide is 0.7 to 1 During Phthalimidomethylation 419.3 g of phthalimide, 1410 g of 1,2-dichloroethane (DCE) and 242.5 g of 30% by weight formaldehyde solution are initially charged into a four-neck flask at RT and healed to boiling point.

At commencement of reflux (about 70° C.) the pH is adjusted to pH 5.5-6.0 with aqueous sodium hydroxide solution, ω (NaOH)=50%. The mixture is boiled at boiling point for 30 min. The water is then removed. 30.7 g of monohydrate are then added at about 70'C.

Water is then again removed until the ether is obtained. The mixture is then stirred at RT for up to 12 h and 245.7 g of oleum, ω (free SO3) 65%, are then metered in at 25-30° C.

317.1 g of monodisperse bead polymer from example 1 in 1000 ml of DCE are then added at 30-40° C. The mixture is stirred at 65° C. for 6.5 h.

The DCE liquor is suctioned off via a filter suction pipe, the filtrate is re-slurried with preheated DM water (max. 70° C.) and the remaining DCE is distilled off.

The resin is then rinsed out with DM water.

Volume yield=1900 ml of resin

Dry weight=0.3932 g/ml

Elemental Analysis:

Nitrogen content 5.0% by weight

Sulfur content 3.1% by weight

Preparation of an Aminomethyl-Containing Resin Further Comprising $SO_3H$ Groups 2100 ml of resin from example 2a), 2520 ml of aqueous sodium hydroxide solution prepared from 767 g of 50% by weight aqueous sodium hydroxide solution and 2140 ml of water are charged at RT into a 6 l VA autoclave.

The autoclave is then heated up to 180° C. at 200 rpm over 2 h.

The autoclave is held at this temperature for 8 h.

After cooling the test product is washed with DM water until neutral.

Volume yield=1571 ml

HCl number supplied form CI form OH form 1.29 mol/l 30 ml 38 ml 31 ml

Washing water=>0.5 l/30 ml

Substitution=0.63

Dry weight=0.2696 g/ml

Preparation of a Resin Comprising Aminomethylphosphonic Acid Groups and Further Comprising $SO_3H$ Groups 1520 ml of resin from example 2b) is initially charged into a round flask together with 759 ml of DM water at room temperature. 701.6 g of dimethyl phosphite are then added dropwise over 15 min and the mixture is stirred for a further 15 min. 1962 g of 98% by weight sulfuric acid are then metered in over 2 h. The mixture is then heated to 95° C. 716 g of 30% by weight formaldehyde solution are then added dropwise at 95° C. The mixture is stirred at 95° C. for a further 4 h. After cooling the resin is washed with DM water until neutral.

Volume yield=1870 ml

The resin is converted into the free base form with aqueous sodium hydroxide solution, ω (NaOH)=4%.

Volume yield=2680 ml

NaOH number: 2.78 mol/l

The presence of chelating aminomethylphosphonic acid groups is reflected by the NaOH number. 2.78 mol of aminomethylphosphonic acid groups are present per liter of end product.

NaCl number: 0.79

The presence of strongly acidic sulfonic acid groups is reflected by the NaCl number and by the sulfur content of 5.0% by weight.

0.79 mol of sulfonic acid groups are present per liter of end product.

End Product Composition by Elemental Analysis

ω (N)=4.6% by weight ω (P)=8.3% by weight ω (O)=27.0% by weight ω (S)=5.0% by weight

TABLE 1

| Test | Structural elements | Mol of free SO$_3$ per mole of phthalimide | End product % by weight of sulfur | End product % by weight of oxygen | End product % by weight of nitrogen | End product % by weight of phosphorus | Amount of chelating groups in mol/liter of resin | Amount of strongly acidic groups in mol/liter of resin |
|---|---|---|---|---|---|---|---|---|
| Example 1 | Sulfonic acid groups and aminomethyl-phosphonic acid groups | 0.7 to 1 | 5.0 | 27.0 | 4.6 | 8.3 | 2.78 | 0.79 |

Summary of results from example 1

What is claimed is:

1. A chelating resin comprising functional groups of structural element (I)

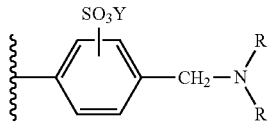

in which:

~~~~~~~ represents a polymer skeleton;

$R_1$ and $R_2$, independently of one another, represent —CH$_2$COOX, —CH$_2$PO(OX$^1$)$_2$, —CH$_2$PO(OH)OX$^2$, —(CS)NH$_2$, —CH$_2$-pyridyl or hydrogen, wherein $R_1$ and $R_2$ cannot both simultaneously be hydrogen; and X, X$^1$, X$^2$ and Y independently of one another represent hydrogen, sodium or potassium.

2. The chelating resin as claimed in claim 1, wherein: $R_1$ and $R_2$, independently of one another, are —CH$_2$PO(OX$^1$)$_2$, —CH$_2$PO(OH)OX$^2$ or hydrogen; and X$^1$ and X$^2$, independently of one another, represent hydrogen, sodium or potassium.

3. A process for preparing the chelating resin as claimed in claim 1, the process comprising:
a) convening monomer droplets composed of:
at least one monovinylaromatic compound and at least one polyvinylaromatic compound, and
at least one initiator or an initiator combination into a bead polymer,
b) phthalimidomethylating and sulfonating the bead polymer with phthalimide in the presence of oleum to produce phthalimidomethylated, sulfonated bead polymer, wherein the amount of free SO$_3$ is at least 0.69 mol based on 1 mol of phthalimide,
c) converting the phthalimidomethylated, sulfonated bead polymer into aminomethylated, sulfonated bead polymer, and
d) reacting the aminomethylated, sulfonated bead polymer to afford chelating resins comprising functional groups of structural element (I).

4. The process for preparing the chelating resin as claimed in claim 3, wherein the bead polymers in step a) are prepared in monodisperse form and thus monodisperse chelating resins are prepared.

5. The process for preparing the chelating resin as claimed in claim 3, wherein the amount of free SO$_3$ in step b) is between 0.69 and 1.5 mol based on 1 mol of phthalimide.

6. The process for preparing the chelating resin as claimed in claim 3, wherein the amount of free SO$_3$ in step b) is between 0.69 and 1.2 mol based on 1 mol of phthalimide.

7. A chelating resin comprising functional groups of structural element (I) prepared as claimed in claim 3.

8. A method for adsorption of metals from fluids, the method comprising contacting a fluid containing metals with the chelating resin of claim 1 and adsorbing the metals from the fluid onto the chelating resin.

9. The method as claimed in claim 8, wherein the fluid comprises aqueous solutions or organic liquids.

10. The method as claimed in claim 8, wherein the metals are selected from the group mercury, gallium, iron, cobalt, nickel, copper, zinc, lead, indium, cadmium, manganese, uranium, vanadium, elements of the platinum group, gold, silver, or the rare earths.

11. The method as claimed in claim 8, wherein the metals are rare earths.

12. The method as claimed in claim 11, wherein the rare earths are scandium, lanthanum, cerium, praseodymium, neodymium, promethium, samarium, europium, yttrium, gadolinium, terbium, dysprosium, holmium, erbium, thulium, ytterbium, lutetium, scandium, yttrium and lanthanum.

13. The method as claimed in claim 8, wherein the metals are selected from the group indium, scandium, neodymium, lanthanum and praseodymium.

14. A method for preparing and purifying silicon with the chelating resin according to claim 1, the method comprising:
reacting a silicate with an acidifying agent in the presence of the chelating resin according to claim 1 to produce high-purity silicon dioxide, and
reducing the high-purity silicon dioxide to produce silicon having a purity of greater than 99.99%.

15. The method as claimed in claim 14, wherein the chelating resin comprises functional groups of structural element (I), wherein $R_1$ and $R_2$, independently of one another, are —CH$_2$PO(OX$^1$)$_2$ or —CH$_2$PO(OH)OX$_2$ and X$^1$ and X$^2$, independently of one another, represent hydrogen, sodium or potassium.

16. The chelating agent as claimed in claim 1, wherein:
$R_1$ is hydrogen, —CH$_2$PO(OX$^1$)$_2$ or —CH$_2$PO(OH)OX$^2$; and
$R_2$ is —CH$_2$PO(X$^2$)$_2$ or —CH$_2$PO(OH)OX$^2$.

17. The chelating agent as claimed in claim 1, wherein:
$R_1$ is hydrogen;
$R_2$ is —CH$_2$PO(OX$^2$)$_2$ or —CH$_2$PO(OH)OX$^2$; and
X, X$^1$, X$^2$ and Y represent hydrogen.

18. The chelating agent as claimed in claim 17, wherein the —SO$_3$H radical is located in an ortho position in relation to the —CH$_2$— group.

* * * * *